United States Patent
Stief et al.

[11] Patent Number: 5,931,754
[45] Date of Patent: Aug. 3, 1999

[54] TENSIONER FOR A POWER TRANSMITTING MEMBER OF AN INTERNAL COMBUSTION ENGINE

[75] Inventors: Hermann Stief, Rosstal; Thomas Ullein, Stegaurach; Dieter Schmidt, Nürnberg, all of Germany

[73] Assignee: Ina Wälzlager Schaeffler OHG, Herzogenaurach, Germany

[21] Appl. No.: 08/988,334

[22] Filed: Dec. 1, 1997

Related U.S. Application Data

[63] Continuation of application No. PCT/EP96/01683, Apr. 23, 1996.

[30] Foreign Application Priority Data

Jun. 10, 1995 [DE] Germany ............................ 195 21 282
Oct. 14, 1995 [DE] Germany ............................ 195 38 401

[51] Int. Cl.⁶ .................................. F16H 7/08; F16H 7/22
[52] U.S. Cl. ............................................. 474/109; 474/111
[58] Field of Search .................................... 474/101, 109, 474/110, 111, 117

[56] References Cited

U.S. PATENT DOCUMENTS

| | | | |
|---|---|---|---|
| 4,874,352 | 10/1989 | Suzuki ..................................... | 474/110 |
| 4,889,087 | 12/1989 | Bergsten .............................. | 123/90.31 |
| 5,030,169 | 7/1991 | Kiso et al. ............................. | 474/110 |
| 5,116,284 | 5/1992 | Cho ........................................ | 474/110 |
| 5,304,099 | 4/1994 | Deppe et al. ......................... | 474/110 |
| 5,370,584 | 12/1994 | Todd ...................................... | 474/110 |
| 5,658,212 | 8/1997 | Meurer et al. ......................... | 474/110 |
| 5,700,214 | 12/1997 | Kuznets et al. ....................... | 474/110 |
| 5,704,860 | 1/1998 | Stief ....................................... | 474/110 |
| 5,720,684 | 2/1998 | Mott ....................................... | 474/110 |
| 5,785,619 | 7/1998 | Nakakubo et al. .................... | 474/110 |

FOREIGN PATENT DOCUMENTS

| | | |
|---|---|---|
| 0 265 727 | 5/1988 | European Pat. Off. . |
| 0 289 814 A1 | 11/1988 | European Pat. Off. . |
| 0 615 076 A1 | 9/1994 | European Pat. Off. . |
| 1.474.011 | 2/1967 | France . |
| 2 526 908 | 11/1983 | France . |
| OS 1 650 620 | 8/1967 | Germany . |
| 36 36 919 A1 | 10/1986 | Germany . |
| 39 22 037 A1 | 7/1989 | Germany . |

*Primary Examiner*—John A. Jeffery
*Assistant Examiner*—Matthew A. Kaness
*Attorney, Agent, or Firm*—Henry M. Feiereisen

[57] ABSTRACT

A tensioner for the chain or the belt of an internal combustion engine, for example of the camshaft drive, includes a cylindrical tensioner housing (2) with a piston (1) loaded by a compression spring (13) arranged therein, the tensioner housing and the piston being axially displaceable relative to each other. The displaceable element which is displaceable relative to the fixed element in chain tensioning direction, is surrounded by a first stop ring which limits its backward movement. According to the invention, the first stop ring is configured as a retaining clip (15) whose arms engage into a locking groove (16) of the tensioner housing (2) under radial pre-stress and, upon a displacement thereof, can come to bear axially against a stop surface of the receiving housing (3).

16 Claims, 3 Drawing Sheets

TENSIONER FOR A POWER TRANSMITTING MEMBER OF AN INTERNAL COMBUSTION ENGINE

This application is a continuation of pending international application number PCT/EP96/01683, filed Apr. 23, 1996.

BACKGROUND OF THE INVENTION

The present invention relates to a tensioner for the chain or the belt, for example for the camshaft drive of an internal combustion engine, and in particular to a tensioner of a type including a cylindrical tensioner housing with a piston loaded by a compression spring arranged therein, the tensioner housing and the piston being axially displaceable relative to each other, and the element which is displaceable relative to the fixed element in chain tensioning direction being surrounded by a first stop ring which limits the backward movement thereof.

Such a tensioner is arranged in the slack side of the chain drive and the compression spring transmits the tensioning forces into the slack side of the control gear. The mean tensioning forces occurring here during normal operation are lower than in the working or tensioned side so that the compression spring can be configured in accordance with these lower tensioning forces. The piston and tensioner housing assembly acting on the chain extends as a result of the force of the compression spring and thus produces the required chain tensioning force.

This assembly can be configured as a hydraulic damping device with an oil reservoir, a high pressure chamber and an intermediate non-return valve. When the piston and tensioner housing assembly is loaded by force pulses from the chain drive, hydraulic oil contained therein, which, due to its pressure, assists the action of the compression spring, can be pressed out of the high pressure chamber through the leak. gap formed between the piston and the tensioner housing by overcoming the fluid friction.

In special cases, when the high pressure chamber is not yet, or only partly filled with oil and the oil pressure in the high pressure chamber has not yet, or only partly been built-up, the required chain tension cannot be established by such a tensioner. Force pulses from the chain drive can then lead to a sudden retraction of the tensioner because the damping effect is inadequate. One example of such a special case for a vehicle engine is when the vehicle is parked uphill in driving direction with a forward gear engaged so that the engine tends to rotate in reverse direction due to the weight of the vehicle. This produces tension in the slack side of the chain. In such a case, if no stop ring is provided for limiting backward movement, the high chain tension leads to the piston and tensioner housing assembly of the hydraulic pressure generator being completely retracted after a longer standstill of the engine. If the engine in now started causing a sudden relaxation of the slack side, the chain tension is insufficient because the piston is greatly retracted so that uncontrolled knocking of the chain can result. This can lead to the chain jumping one or more teeth of the drive pinion of the camshaft drive. This causes a misadjustment of timing in the valve gear which results in damage to the engine, for example due to the valve disks striking against the piston bottoms.

A tensioner of the initially cited type is known from DE-OS 36 36 919. In this tensioner, the piston which can extend out of the fixed tensioner housing acts in tensioning direction on the chain to be tensioned. When this chain tensioner is set into operation, the first stop ring snaps into a first locking groove of the tensioner housing. This position is the beginning of the chain tensioning range. When the pressure in the high pressure chamber is not sufficient to bring the piston to a stop under load, a stop edge of the piston comes to abut against the first stop ring. This stops the backward movement of the piston into the tensioner housing. The stop ring therefore acts as a safety device against a back stroke or sinking.

Stop rings of this type are made of wire which must have a certain minimum wire diameter because of the combined effect of the dimensional tolerances and strength properties of the components. With this minimum diameter, the wire of the stop ring whose ring diameter has to be slightly adjustable during operation, already possesses a high degree of stiffness which increases considerably when the ring diameter diminishes and the wire diameter remains the same.

SUMMARY OF THE INVENTION

It is thus an object of the present invention to provide an improved tensioner, obviating the afore-stated drawbacks.

In particular, it is an object of the present invention to provide an improved tensioner which requires a small installation space and consequently having smaller overall dimensions than prior art chain tensioners.

These objects, and others which will become apparent hereinafter, are attained in accordance with the present invention by configuring the first stop ring as a two-arm, U-shaped retaining clip whose arms engage under radial pre-stress into a locking groove of the displaceable element and, upon displacement thereof, can come to bear axially against a fixed stop.

With the use of a retaining clip in place of a circular stop ring as a safety device against sinking, the stiffness of this limiting element can be configured within acceptable limits without having to reduce the wire diameter when the locking groove has a reduced diameter. With an unchanged stiffness of the first stop ring configured as a retaining clip, the force of the compression spring can also remain the same so that the influence of an undesired high or strongly varying spring force on the chain to be tensioned is avoided.

As a displaceable element, the tensioner housing can be guided in a cylindrical bore of a fixed receiving housing, the fixed stop being arranged on the receiving housing while being constituted by a second stop ring which is inserted radially biased into an inner peripheral groove of the receiving housing. It is, however, also possible for the displaceable element to be a piston guided in the tensioner housing which is inserted into a cylindrical bore of a fixed receiving housing.

A plurality of locking grooves in the form of outer peripheral grooves for receiving the retaining clip can be arranged in axially spaced relationship on the tensioner housing. In the fully inserted position of the tensioner housing in the receiving housing, a transport safety circlip can be mounted on the receiving housing to engage into a peripheral groove of the tensioner housing. The transport safety circlip can be arranged between the retaining clip and the second stop ring. When the tensioner has been mounted on the engine, the transport safety clip is removed, whereupon the tensioner takes its operating position. The retaining clip now constitutes the mechanical safety device for the tensioner housing against sinking to limit a back stroke thereof in the receiving housing when the high pressure chamber is empty and the force exerted by the chain is high. Moreover, the retaining clip also acts as a mechanical safety device against disintegration by holding the structural group consisting of piston, tensioner housing and receiving housing together.

The tensioner housing and the piston can be held together additionally by an outwardly biased securing ring which projects radially, partly into a peripheral groove of the piston and can come to bear axially against a ramp of the surrounding tensioner housing. In this case, the diameter of the groove bottom of the peripheral groove of the piston can be made slightly smaller than the diameter of the securing ring which enables the latter to be completely received in the groove.

The piston and the tensioner housing can be steel parts, while the receiving housing can be made of an aluminum alloy.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
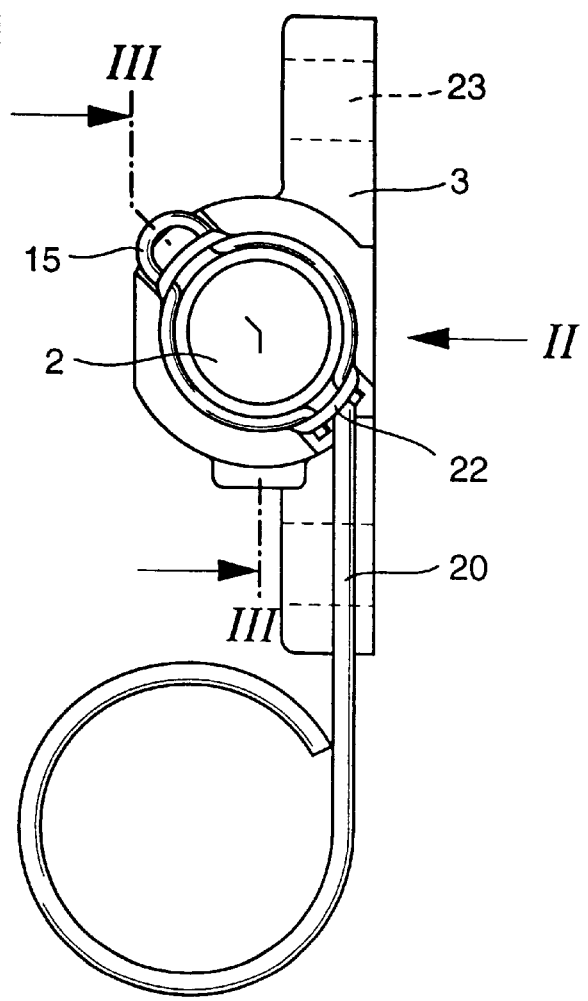
FIG. 1 is an end view of a tensioner pointing in chain tensioning direction.
Figure 2:
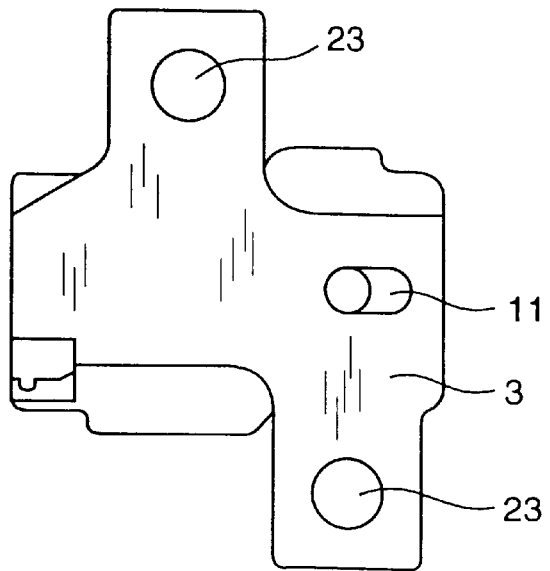
FIG. 2 is a bottom view of the receiving housing of the tensioner following arrow II of FIG. 1.

Turning now to the drawing, and in particular to FIGS. 1 to 4, there are shown a tensioner according to the present invention, a piston 1, a tensioner housing 2 and a receiving housing 3. The piston 1 constitutes the fixed element with one of its ends inserted into the tensioner housing 2 which is configured as a cylindrical body and constitutes the displaceable element. The piston 1 is held by a securing element designated here as a securing ring 4. This securing ring 4 is situated in an outer peripheral groove 5 of the piston 1 from which it projects partially in radial direction. During relative displacement between the piston 1 and the tensioner housing 2, the securing ring 4 can come to abut against a ramp 6 of the tensioner housing 2 and thus prevent further relative displacement. For mounting, the securing ring 4 is pressed in radial direction completely into the peripheral groove 5 of the piston 1 and springs back radially when the tensioner housing 2 has been pushed on.

A non-return valve 7 separating a high pressure chamber 8 of the tensioner housing 2 from an oil reservoir 9 of the piston 1 is arranged in the connecting region between the piston 1 and the tensioner housing 2. The piston 1 made as a cylindrical body is supported at its end remote from the non-return valve 7 on the bottom of the receiving housing 3 in whose cylindrical bore 10 it is arranged. Thus, the piston 1, like the receiving housing 3, is stationary. It is supplied through an oil input opening 11 and an oil transfer groove 12 with hydraulic oil which flows into the oil reservoir 9.

A compression spring 13 arranged in the tensioner housing 2 is supported at one end on the piston 1 and at the other end on the piston-remote bottom of the tensioner housing 2. This compression spring 13 effects the extension of the tensioner housing 2 out of the receiving housing 3, away from the piston 1 in a chain tensioning direction, whereas force pulses from the chain cause the tensioner housing 2 to retract against the action of the compression spring 13 into the tensioner housing 2, over the piston 1. The non-return valve 7 with a ball as a closing member can open during the extension of the tensioner housing 2 and is closed during retraction. The hydraulic oil contained in the high pressure chamber 8 flows out of the tensioner housing 2 through a leak gap 14 between the piston 1 and the tensioner housing 2 during retraction. This pressing-out of hydraulic oil from the high pressure chamber 8 of the tensioner housing 2 is accompanied by a high fluid friction and thus has a damping effect on the chain to be tensioned which transmits its force pulses to the tensioner housing 2.

The tensioner housing 2 is surrounded by a two-arm, U-shaped retaining clip 15 acting as a first stop ring for which a plurality of axially spaced locking grooves are made on the tensioner housing 2. Thus, viewed from its bottom in the direction of the piston 1, the tensioner housing 2 successively comprises, a first locking groove 16, a second locking groove 17 and a third locking groove 18. The retaining clip 15 can engage into one of the locking grooves 17 or 18, as the case may be, and thus prevent the further inward movement of the tensioner housing 2 into the receiving housing 3 by coming to abut against an inclined stop surface 19.

Figure 3:
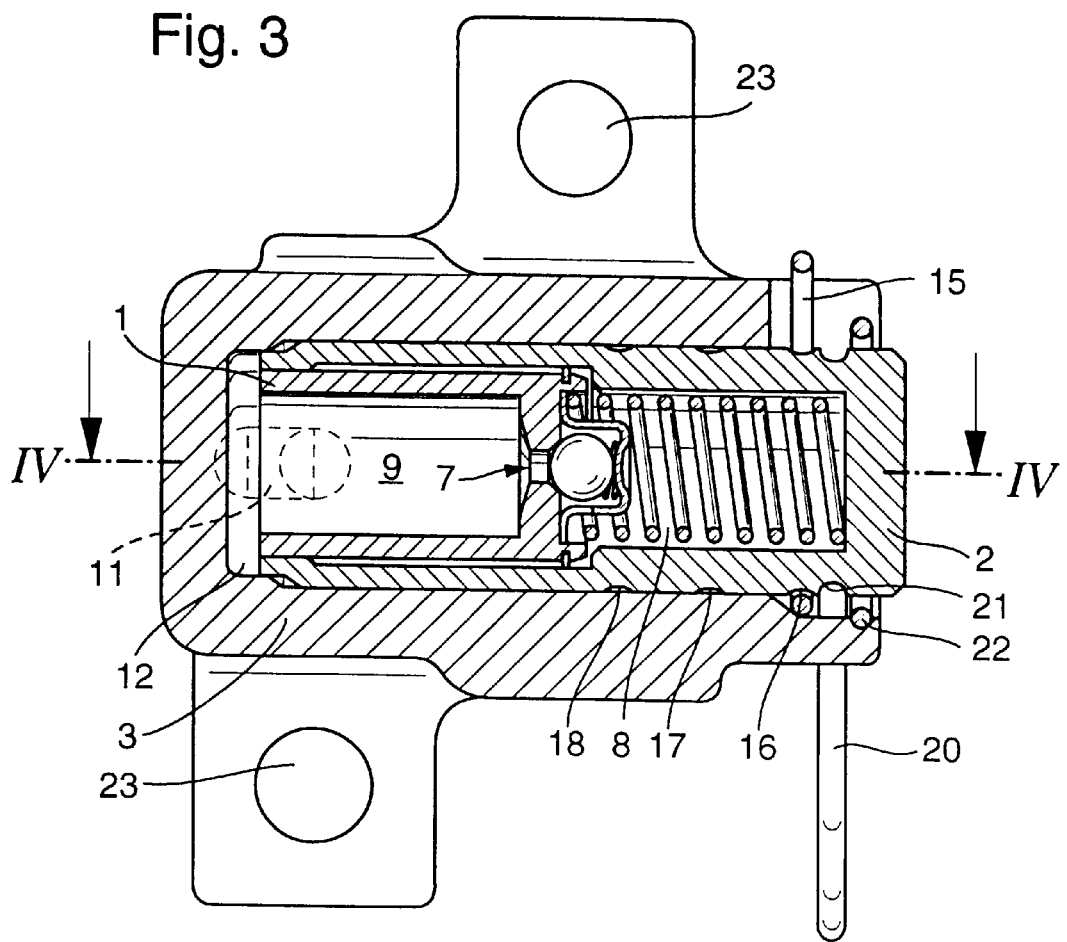
FIG. 3 is a longitudinal section through the tensioner in the retracted state of the tensioner housing.
Figure 4:
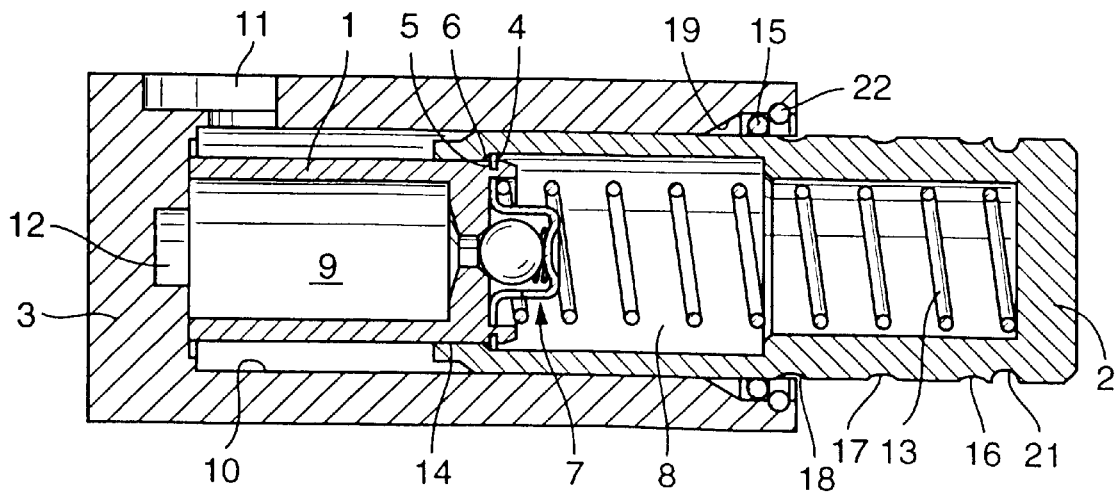
FIG. 4 is a longitudinal section through the tensioner taken along line IV—IV of FIG. 3, but with the tensioner housing extended.

In FIG. 3, the tensioner is shown in its transport position with the tensioner housing 2 completely retracted into the receiving housing 3 where it is held by a transport safety circlip 20 which engages into a peripheral groove 21 of the tensioner housing 2 in the region of the bottom thereof. The locking groove 16 serves to prevent the retaining clip 15 from locking into the peripheral groove 21 which is required for the transport of the tensioner. The transport safety circlip 20 bears axially against a second stop ring 22 which is retained in an inner peripheral groove of the receiving housing 3. An extension of the tensioner housing 2 out of the receiving housing 3 is not possible as long as the transport safety circlip 20 is situated in the peripheral groove 21 of the tensioner housing 2 at least at one peripheral point.

The tensioner is assembled for transportation as follows: After the assembly of the piston 1, the non-return valve 7, the compression spring 13 and the tensioner housing 2, the retaining clip 15 is pushed axially onto the tensioner housing 2 and engages into the first locking groove 16. The thus prepared piston and tensioner housing assembly is then inserted into the cylindrical bore 10 of the receiving housing 3 following which the tensioner housing is pressed completely into the receiving housing 3 against the action of the compression spring 13. The second stop ring 22 can now be inserted into the groove provided for it in the receiving housing 22. The transport safety circlip 20 is then inserted into the receiving housing 3 in a direction transverse to the axial direction and engages into the peripheral groove 21 of the tensioner housing 2. The tensioner housing 2 can now no longer be displaced out of the receiving housing 3 by the action of the compression spring 13 because the transport safety circlip 20 bearing against the second stop ring 22 prevents such a movement. The receiving housing can now be transported and screwed onto the engine at its location of use with the help of two screw holes 23 provided for this purpose.

This tensioner represented in FIGS. 1 to 4 functions as follows: After the tensioner has been screwed onto the engine, the transport safety circlip 20 of the tensioner is removed whereby the tensioner takes its operating position. When the tensioner housing 2 is displaced out of the cylindrical bore 10 of the receiving housing 3 as a result of the action of the compression spring 13, the retaining clip 15 which is situated in the first locking groove 16 of the tensioner housing 2 and biased towards it is entrained by the tensioner housing 2 till it comes to be situated against the second stop ring 22. Such an extension can become possible as a result of a lengthening of the chain, for example due to wear. If the tensioner housing 2 now moves further outwards, the retaining clip 15 is displaced relative to the tensioner housing 2 and snaps into the next locking groove 17. If the engine is now switched off, for example on a hill, so that the tensioner housing 2 is pressed back against the force of the compression spring 13 into the receiving housing 3 as a result of a high chain force in the slack side, the retaining clip 15 comes to be situated on the inclined stop surface 19 of the receiving housing 3 and thus prevents a further retraction or sinking of the tensioner housing 2. In this way, the timing chain is prevented from jumping over any teeth on its drive pinion on re-ignition of the engine. Besides this, due to this limitation of the back stroke, less oil is pressed out of the high pressure chamber 8 so that the amount of oil required to refill the high pressure chamber 8 when the engine is started is smaller and this is important for preventing noises which can occur due to a lack of damping.

At the same time, the tensioner also guarantees a minimum back stroke of the tensioner housing 2 which is required for compensating eccentricities of the chain pulleys and thermal expansions, and for the provision of a damping stroke. This stroke is identifiable in FIG. 3 as the distance between the retaining clip 15 and the second stop ring 22.

Figure 5:
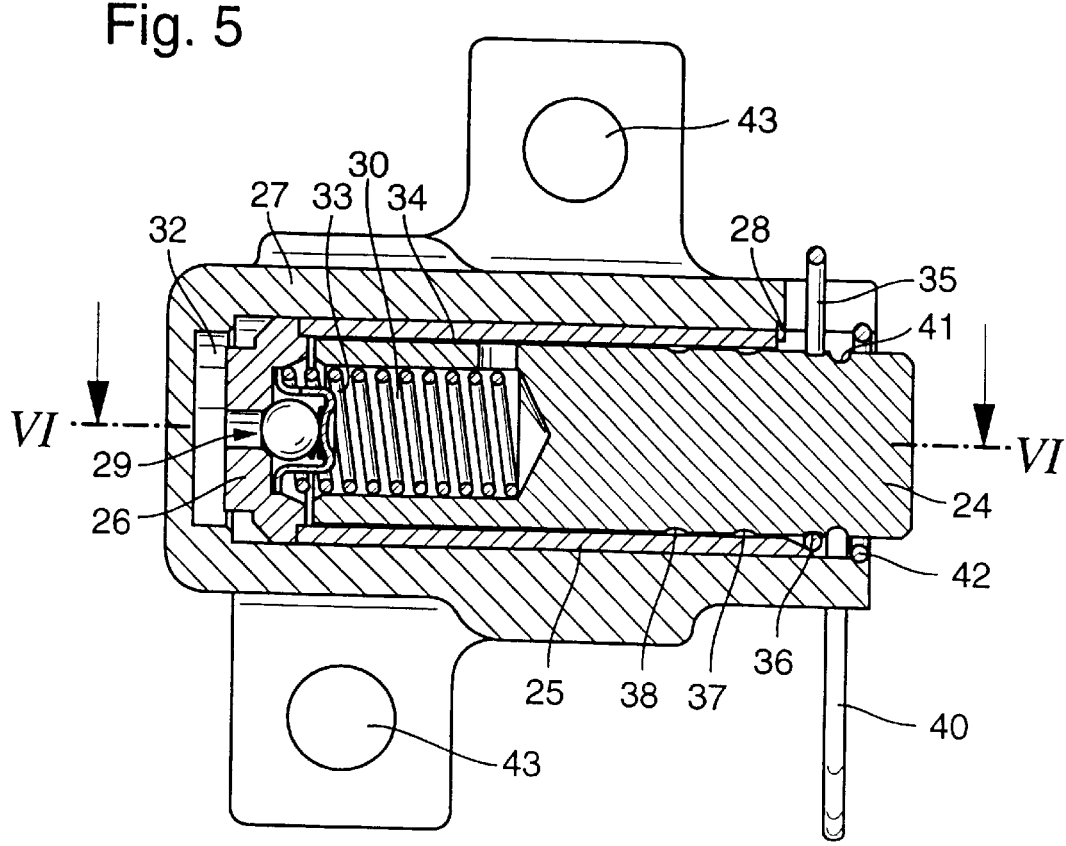
FIG. 5 is a longitudinal section through a modified tensioner in the retracted state.
Figure 6:
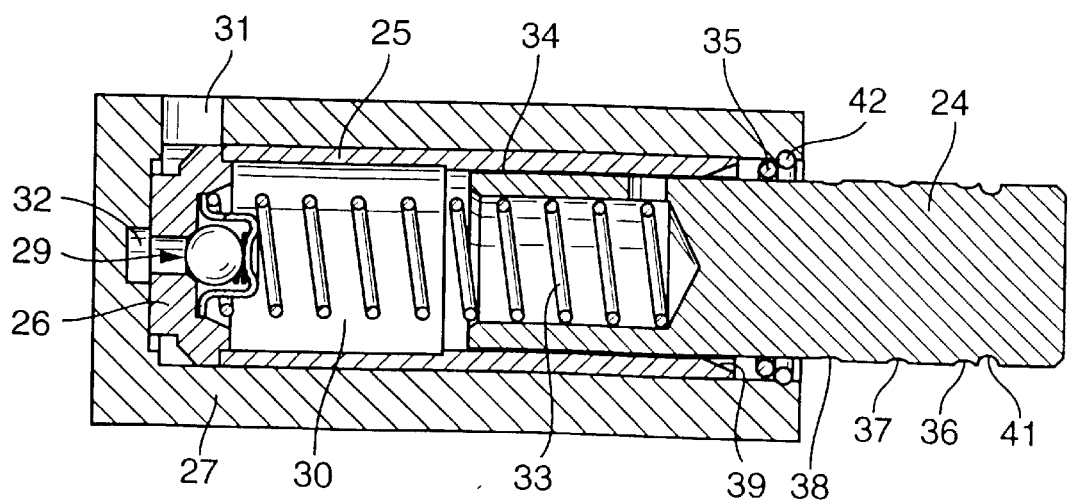
FIG. 6 is a longitudinal section through the modified tensioner taken along line VI—VI of FIG. 5, but with the tensioner housing extended.

In the modified tensioner of the invention shown in FIGS. 5 and 6, a piston 24 is guided as a displaceable element in a cylindrical tensioner housing 25 made of steel which constitutes the fixed element. A valve seating disc 26 is welded on one end of the tensioner housing 25. Together with this valve seating disc 26, the tensioner housing 25 is inserted into a receiving housing 27 made of aluminum. At the end of the tensioner housing 25 remote from the valve seating disc 26, the receiving housing 27 comprises, at at least one peripheral point, a calking 28 by which the tensioner housing 25 is retained in the receiving housing 27 and prevented from rotating. The valve seating disc 26 is supported on the bottom of the receiving housing 27.

A non-return valve 29 arranged in the tensioner housing 25 seals the inner space, which serves as a high pressure chamber 30 for hydraulic oil, with respect to an oil supply duct. The oil supply is effected through an oil inlet opening 31, an oil transfer groove 32 of the receiving housing 27 and a central bore of the valve seating disc 26.

In the tensioner housing 25, a compression spring 33 is arranged in a bore of the piston 24 which forms the high pressure chamber 30, one end of the compression spring 33 being supported on the piston 24 and the other end on the valve seating disc 26 of the tensioner housing 25. This compression spring 33 effects the extension of the piston 24 out of the tensioner housing 25 in chain tensioning direction, while force pulses from the chain cause the retraction of the piston 24 into the tensioner housing 25 against the action of the compression spring 33. The non-return valve 29 with a ball as a sealing member, can open during the extension of the piston 24 and is closed during retraction. The hydraulic oil contained in the high pressure chamber 30 flows out of the high pressure chamber 30 through a leak gap 34 between the piston 24 and the tensioner housing 25 during retraction. This pressing-out of hydraulic oil from the high pressure chamber 30 is accompanied by a high fluid friction and thus has a damping effect on force pulses which the chain to be tensioned transmits to the piston 24.

The piston 24 is surrounded by a two-arm, U-shaped retaining clip 35 acting as a first stop ring for which a plurality of axially spaced locking grooves are made on the piston 24. Thus, viewed from its outer end face in the direction of the tensioner housing 25, the piston 24 successively comprises, a first locking groove 36, a second locking groove 37 and a third locking groove 38. In the fully extended state, the retaining clip 35 engages into the first locking groove 35. During extension of the piston 24, the retaining clip 15 can engage into one of the locking grooves 37 or 38, as the case may be, and thus prevent the further inward movement of the piston 24 into the receiving housing 25 by coming to abut against an inclined stop surface 39.

In FIG. 5, the tensioner is shown in its transport position with the piston 24 completely retracted into the receiving housing 27 where it is held by a transport safety circlip 40 which engages into a peripheral groove 41 of the piston 24 in the outer end thereof. The locking groove 36 serves to prevent the retaining clip 35 from locking into the peripheral groove 41 which is required for the transport of the tensioner. The transport safety circlip 40 bears axially against a second stop ring 42 which is retained in an inner peripheral groove of the receiving housing 27. An extension of the piston 24 out of the tensioner housing 25 and the receiving housing 27 is not possible as long as the transport safety circlip 40 is situated in the peripheral groove 41 of the piston 24 at least at one peripheral point. For fixing the tensioner on the engine at its location of use, two screw holes 43 are provided on the receiving housing 27. The assembly for transportation and the method of functioning of this modified tensioner according to FIGS. 5 and 6 correspond to the assembly and method of functioning of the tensioner of FIGS. 1 to 4 described above.

The invention creates tensioners in which a prevention of sinking is obtained by mechanical means and which can be made with a very small outer diameter of the housing, for example below 14 mm. Such a tensioner thus requires only a small space. The tensioner is simple and economical to manufacture. For the actuation of its locking system, only a small tensioner force is required. The tensioners of the invention comprise simple safety devices in the form of the transport safety circlips 20, 40 for locking the displaceable element (tensioner housing 2 or piston 24) for mounting on the engine.

The retaining clips 15, 35 of the tensioners can be made of a spring steel, which is bent into a U-shape and prestressed, so that they always bear against the periphery of the displaceable element (tensioner housing 2 or piston 24). In the tensioner shown in FIG. 5, the piston 24 is unlocked by pulling the transport safety circlip 40, and as a result of the spring force of the compression spring 33 and the engine oil pressure acting in the high pressure chamber 30, the piston 24 extends out of the tensioner housing 25 in chain tensioning direction. Due to its prestress, the retaining clip 35 is at first entrained by the piston 24 till it comes to bear against the second stop ring 42. On further extension of the piston 24, the retaining clip 35 slides along the piston 24, and in keeping with a lengthening of the chain, snaps into the next locking groove 37. When the engine is switched off and the engine hydraulic pressure is inactive so that the piston 24 can no longer be retained against the pressure acting on its end from the chain, the piston 24 retracts into the tensioner housing 25. During this retraction, the hydraulic oil in the high pressure chamber 30 is pressed out through the leak gap 34.

This retraction of the piston 24 is stopped when the retaining clip 35 comes to bear against the inclined stop surface 39 (FIG. 6) of the tensioner housing 25. Thus a jumping of the chain on the chain pulley of the control gear is prevented and a rattling of the chain on re-ignition of the engine is avoided. At the same time, in this tensioner too, a minimum back stroke of the piston 24 is guaranteed which is required for compensating eccentricities of the chain pulleys and thermal expansions, and for the provision of a damping stroke.

While the invention has been illustrated and described as embodied in a tensioner for a chain drive, it is not intended to be limited to the details shown since various modifications and structural changes may be made without departing in any way from the spirit of the present invention.

What is claimed as new and desired to be protected by Letters Patent is set forth in the appended claims:

1. A tensioner for a power transmitting member of an internal combustion engine, comprising a fixed element, and a movable element capable of displacement relative to the fixed element, a cylindrical tensioner housing with a piston loaded by a compression spring arranged therein, the tensioner housing and the piston being axially displaceable relative to each other, and the movable element which is displaceable relative to the fixed element in chain tensioning direction being surrounded by a first stop ring which limits the backward movement thereof, wherein the first stop ring is configured as a retaining clip having arms which engage under radial pre-stress into a locking groove of the displaceable element and are adapted to come to bear axially against a fixed stop upon a displacement of the displaceable element.

2. The tensioner of claim 1 wherein the tensioner housing constitutes the displaceable element and is guided in a cylindrical bore of a fixed receiving housing, the fixed stop being constituted by a second stop ring which is arranged on the receiving housing and inserted under radial pre-stress into the receiving housing.

3. The tensioner of claim 2 wherein a plurality of locking grooves in the form of outer peripheral grooves for receiving the retaining clip are arranged in axially spaced relationship on the tensioner housing.

4. The tensioner of claim 2 wherein, in the fully inserted position of the tensioner housing in the receiving housing, a transport safety clip can be mounted on the receiving housing and engages into a peripheral groove of the tensioner housing.

5. The tensioner of claim 4 wherein the transport safety clip is arranged between the retaining clip and the second stop ring.

6. The tensioner of claim 2 wherein the tensioner housing and the piston are held together by an outwardly biased securing ring which projects radially, partly into a peripheral groove of the piston and is adapted to come to bear axially against a ramp of the surrounding tensioner housing.

7. The tensioner of claim 6 wherein a diameter of a groove bottom of the peripheral groove of the piston is slightly smaller than a diameter of the securing ring and enables the securing ring to be completely received in the peripheral groove.

8. The tensioner of claim 2 wherein the piston and the tensioner housing are made of steel, while the receiving housing is made of an aluminum alloy.

9. A tensioner for a power transmitting member of an internal combustion engine, comprising a stationary first element formed with a stop surface;

a second element movable relative to the first element for cooperation with a power transmitting member;

a force application means provided between the stationary element and the movable element for urging the displaceable element to move in a direction toward tensioning the power transmitting member;

a first stop member in the form of a U-shaped retaining clip for limiting a backward movement of the displaceable element, said first stop member being biased in radial direction to seek engagement in a groove formed in an outside surface area of the second element and so adapted as to impact upon the stop surface when the movable element is displaced.

10. The tensioner of claim 9 wherein the second element is a tensioner housing guided in a cylindrical bore of a stationary receiving housing, said stop surface being formed by a second stop ring biased in radial direction for engagement in a circumferential groove formed inside of the receiving housing.

11. The tensioner of claim 10 wherein the second element is formed with a plurality of grooves in axially spaced-apart disposition for indexed engagement by the retaining clip.

12. The tensioner of claim 10 wherein the second element is formed with a circumferential further groove, and further comprising a transport safety clip for engagement in the groove of the second element when the movable element is fully received within the receiving housing.

13. The tensioner of claim 12 wherein the transport safety clip is arranged between the retaining clip and the second stop ring.

14. The tensioner of claim 10 wherein the first element is formed with a circumferential groove, and further comprising an outwardly biased securing ring for holding the first and second elements, said securing ring projecting partly in radial direction into the circumferential groove of the first piston and adapted to impact a ramp of the surrounding second element.

15. The tensioner of claim 14 wherein the circumferential groove of the first element has a bottom diameter which is smaller than a diameter of the securing ring to enable the securing ring to be completely received in the circumferential groove of the first element.

16. The tensioner of claim 10 wherein the first and second elements are made of steel, and the receiving housing is made of an aluminum alloy.

* * * * *